J. Armstrong,

Steam Condenser.

No. 3834. Reissued Feb. 15. 1870.

Witnesses.
Geo. Smith.
E. R. Brown

James Armstrong
Inventor.
By J. C. Theaker
his attorney.

N. PETERS, PHOTO-LITHOGRAPHER, WASHINGTON, D. C.

United States Patent Office.

JAMES ARMSTRONG, OF BUCYRUS, OHIO.

*Letters Patent No.* 81,971, *dated September* 8, 1868; *reissue No.* 3,834, *dated February* 15, 1870.

IMPROVEMENT IN FEED WATER HEATERS AND FILTERS.

The Schedule referred to in these Letters Patent and making part of the same.

*To all whom it may concern:*

Be it known that I, JAMES ARMSTRONG, of Bucyrus, in the county of Crawford, and State of Ohio, have invented a new and useful Improvement in Feed Water Heater and Filter; and I do hereby declare that the following is a full, clear, and exact description thereof, reference being had to the accompanying drawings, in which—

Figure 1:
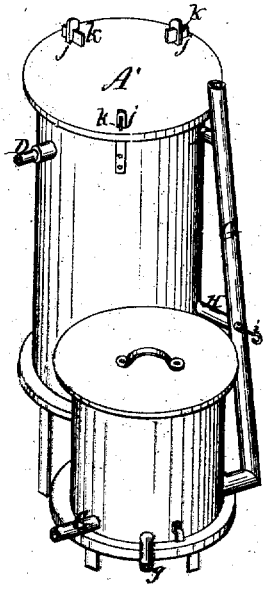
Figure 2:
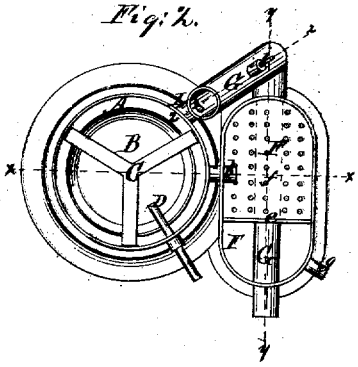
Figure 5:
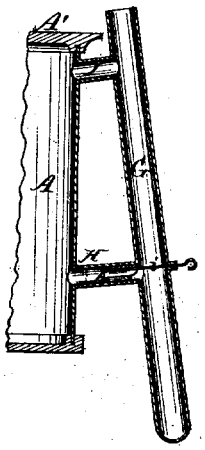
Figure 3:
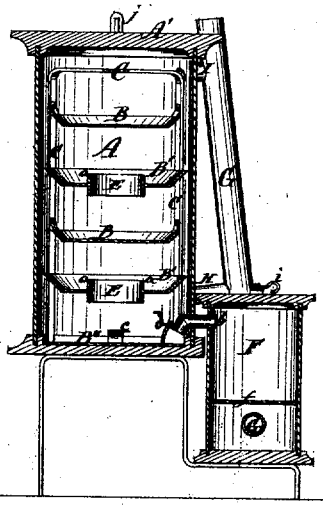
Figure 4:
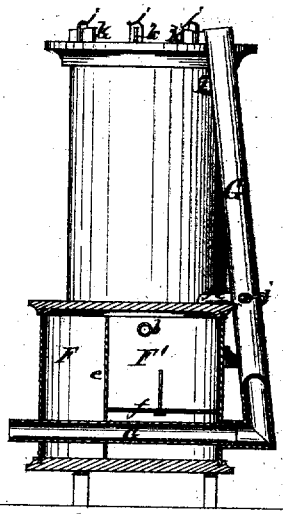

Figure 1 is a perspective view;

Figure 2, a plan view, with the top of the cylinder removed;

Figure 3, a central vertical section taken in the line *x x* of fig. 2;

Figure 4, a vertical section taken in the line *y y* of fig. 2;

Figure 5, a vertical section taken in the line *z z* of fig. 2; and

Figure 6:
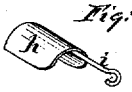

Figure 6, a perspective view of the valve.

Like letters designate like parts in all the figures.

The nature of my invention consists—

First, in the construction and arrangement of pans to be used in feed water heaters and filters for the reception and heating of the water from which it is desired to extract any sediment or impurities contained therein, and to retain the same.

Second, in the arrangement of the steam pipes and the chambers of the heater and filter;

Third, in the peculiar construction of the valve used in the steam pipes; and

Fourth, in making the top or lid of the heater removable.

To enable those skilled in the art to make and use my invention, I will proceed to describe its construction and operation.

In the drawing—

A represents a chamber in which are placed pans B B′, which are secured to a frame, C, which rests upon the bottom of the chamber.

In the side of this chamber is a pipe, D, which enters above and discharges into the upper pan.

Any desired number of pans may be used, but should be arranged as shown in fig. 2, the diameter of the upper one being smaller than the next one below it, and this arrangement is continued with the entire series, the larger ones having openings E in their bottoms, and around their edges are flanges *a*.

On the bottom of the chamber A is a disk, B″, on which is a handle, *c*, by which it can be removed.

Between the chambers A and F is a pipe, *b*, the end inside of the chamber A being above the disk B″, which has an opening in one side of it.

Around this opening is a flange, *d*, and the end of the pipe *b* is inside of this flange.

F represents the chamber into which the water is discharged from the chamber A through the pipe *b*.

Near the bottom of this chamber is a steam pipe, G, which passes through it and extends up outside, and is connected to the chamber A by two horizontal pipes, H and Z, the steam passing into the chamber through the pipe H and escaping through the pipe I.

In the pipe H is a slide-valve, *h*, which is formed of a thin piece of metal, one end being semi-circular or nearly so, and the piece is then bent into a semi-circular form, as shown in fig. 6, so that it will fit into the pipe H and also close the pipe G when it is drawn out.

Attached to it is a rod, *i*, which passes through the side of the steam pipe G, by means of which the valve can be adjusted as desired. The object of this valve is to regulate the quantity of steam passing into the chamber A.

The chamber F is divided by a vertical partition, *e*, the lower part of which is perforated.

In this chamber there is also a perforated horizontal partition, *f*, which is above that portion of the steam pipe G in the chamber.

Near the bottom of the chamber F′ is the discharge-pipe *g* through which the water escapes to the boiler.

The top A′ of the chamber A is so constructed that it can be removed whenever it is desired to remove the pans B B′, which have to be frequently taken out for the purpose of cleansing.

To the outside of the shell of the chamber A are secured pieces *j* which pass through openings in the top A′.

In the upper ends of the pieces *j* are eyes in which the keys *k* are inserted to hold the top firmly to the heater, or instead of the eyes and keys a thread may be cut on the upper end of the pieces *j* and a nut screwed thereon.

In the under side of the top A′ is a groove into which the upper end of the chamber A fits.

Its operation is as follows:

The water enters through the pipe D, fills the upper pan, and when this is full it runs over the edge into the next one below it, which in turn is filled up to the top of the flange *a*, and the water then runs over the top of that into the pan below, and so on throughout the entire series of pans. At the same time the steam is let into chamber from the pipes G and H, and by contact with the water heats it and causes the lime and other impurities in the water to be deposited in the pans.

As the steam passes up in the pipe G only a portion of it enters the chamber A through the pipe H, but if it is desired that all of it should pass through the chamber, it may be made to do so by drawing the valve *h* out of the pipe H across the pipe G, which is thereby closed above the pipe H.

When a sufficient quantity of water has passed through the pans to fill up the bottom of the chamber to the top of the flange *d* of the disk B″, it runs over it into the pipe *b*, and through it into the chamber F, then through the filter *f*, thence through the perforated partition *e* into the chamber F′, from whence it passes into the boiler through the pipe *g*.

Having thus fully described my invention,

What I claim, and desire to secure by Letters Patent, is—

1. The pans B B′, when constructed and arranged substantially in the manner shown and described.

2. The combination of the steam pipe G, chambers F and F′, substantially in the manner shown and described.

3. The chambers F F and the filters *e* and *f*, when constructed substantially in the manner shown and described.

4. The arrangement of the pans B B′ and the disk B″, substantially in the manner described.

5. The valve *h*, when constructed substantially as shown and described.

6. The combination of the pipes G H I, valve *h*, and the chamber A, when constructed and arranged substantially as and for the purpose shown and described.

7. The described feed water heater and filter, provided with a movable top, as shown and described.

Witnesses: JAMES ARMSTRONG.

G. A. C. Smith,

E. R. Brown.